April 5, 1960      W. O. BREWER      2,931,244

CONTROL SYSTEM FOR AUTOMOTIVE VEHICLES

Filed Oct. 18, 1956      3 Sheets—Sheet 1

INVENTOR
WAYNE O. BREWER
BY

ATTORNEY

April 5, 1960 W. O. BREWER 2,931,244
CONTROL SYSTEM FOR AUTOMOTIVE VEHICLES
Filed Oct. 18, 1956 3 Sheets-Sheet 2

INVENTOR
WAYNE O. BREWER
BY
ATTORNEY

INVENTOR
WAYNE O. BREWER
BY

ATTORNEY

United States Patent Office 2,931,244
Patented Apr. 5, 1960

2,931,244

CONTROL SYSTEM FOR AUTOMOTIVE VEHICLES

Wayne O. Brewer, Van Nuys, Calif.

Application October 18, 1956, Serial No. 616,671

1 Claim. (Cl. 74—484)

This invention relates to a control system for automotive vehicles and has for one of its principal objects, the provision of a device of the class described which will place practically all of the control elements of an automotive vehicle or the like in the hands, or practically at the finger tips, of the operator or driver, and with consequent ease of operation.

One of the important objects of this invention is to provide a control for automobiles or the like which, when not in operation, can be pushed or folded completely out of the way and into a position flush with the dash or instrument board of the vehicle, from which position it can be readily withdrawn whenever desired.

Another object of the invention is the provision of a combined steering and control apparatus for automobiles or the like which includes a mechanism to be grasped by the operator and which, in the event of collision or other sudden stop, will collapse to a certain degree, thereby eliminating the danger of injury to the head or body of the driver which would otherwise occur due to contact with a relatively immovable steering post or other control apparatus.

Yet another object of the invention is to provide in a control system for automotive vehicles and the like, a construction whereby setting of the brakes will be almost automatic in the event of a near collision or other emergency.

Still another object resides in the provision of a unique method of automatic power steering which eliminates the use of a steering wheel, while at the same time being much more reliable and accurate, and wherein the operator will at all times be kept optically informed regarding wheel position.

A still further important object is to provide a novel form of throttle control which, like practically all of the other controls herein-above described, is of a dual construction, one for either hand, and which comprises essentially a simple thumb operated push button.

Other and further important objects of the invention will be apparent from the disclosures in the accompanying drawings and following specification.

The invention, in a preferred form, is illustrated in the drawings and hereinafter more fully described.

Figure 1:
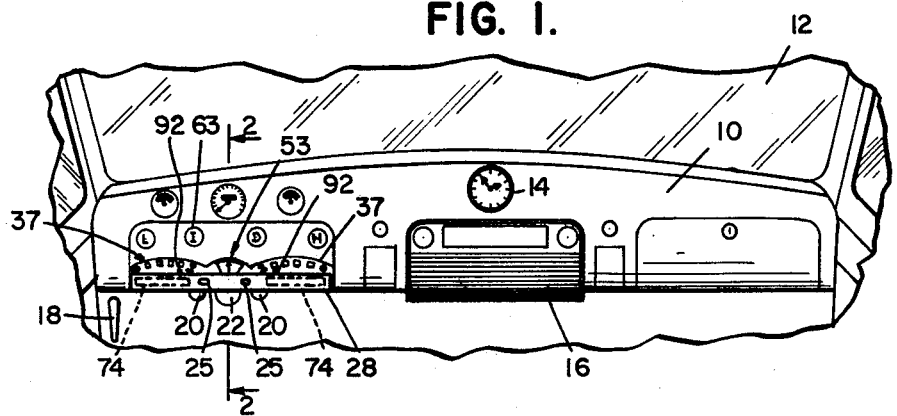
Figure 1 is a perspective view of the dash or instrument board of an automotive vehicle equipped with the novel control system and apparatus of this invention.

The reference numeral 10 indicates generally the dash or instrument board of an automobile or other automotive vehicle, the same preferably being equipped with a windshield 12, a clock 14, a radio 16, and other devices. The conventional and required parking brake is shown at 18.

Figure 3:
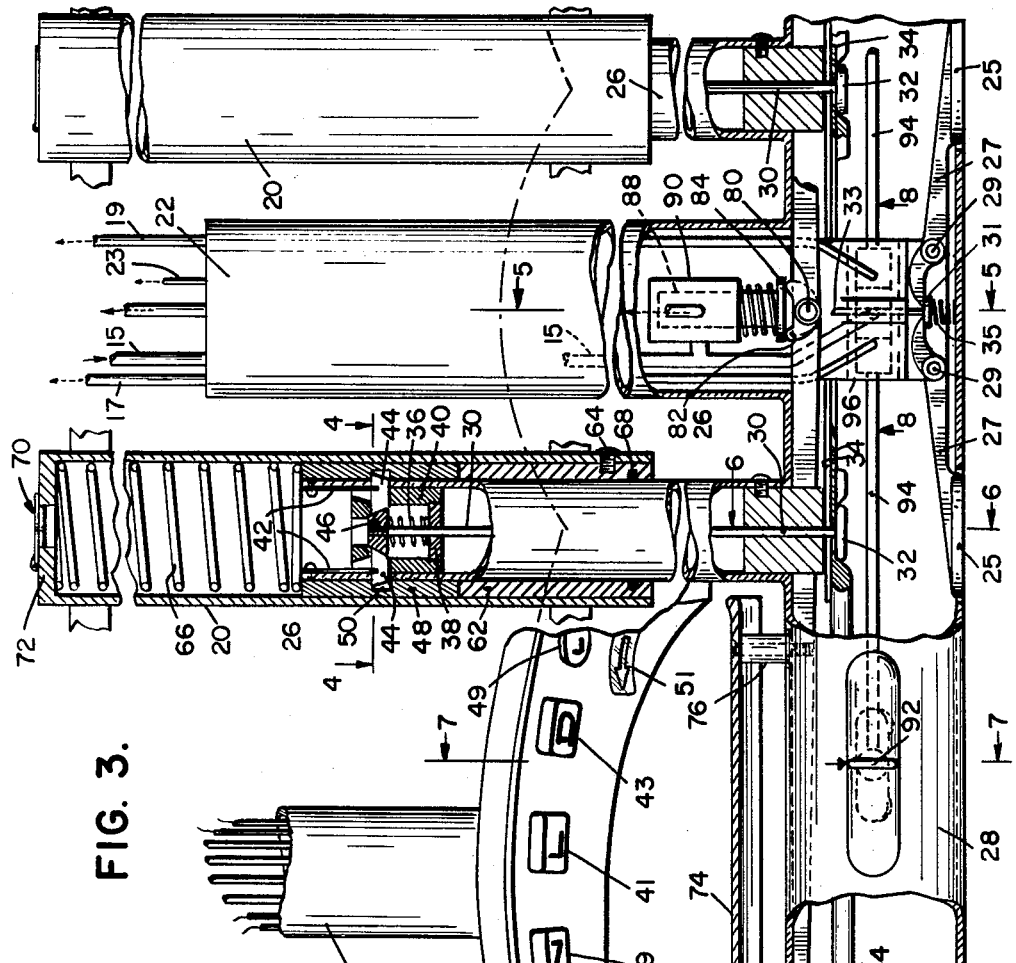
Figure 3 is an enlarged section, in considerable detail, on the line 3—3 of Figure 2 looking in the direction indicated by the arrows.

The apparatus of this invention comprises essentially a pair of cylindrical supporting posts 20 which are fastened to the frame or chassis of the car in any convenient or desired manner. These are separated to accommodate a central conduit 22 in the form of a short cylinder which carries a part of the electric control wires and hydraulic, which form part of the structure of this invention. Another cylindrical conduit 24 is at the left side of the device, as best shown in Figure 3, and it will be understood that a similar conduit with exactly the same equipment is installed on the right hand side of the posts 20, so that a complete control is provided for either hand of the operator.

Slidably mounted in the cylindrical posts or supports 20 is a pair of sleeves 26 to the outer ends of which is affixed a cross tube or handle 28, which is of a size and extent sufficient to be readily grasped by the two hands of the operator of the vehicle. The left hand portion only of this tubular handle 28 is shown in Figure 3; the right hand portion being omitted as it is simply a duplicate of that illustrated.

A rod 30 extends centrally longitudinally of each of the sleeves 26 terminating at one end in a plate or button 32, positioned against a plate 34, fixed in the handle or sleeve element 28. The rod 30 passes through an opening in the plate 34, and the button 32 contacts the plate adjacent the opening. The rods and buttons, which are in duplicate, are held in the position shown in Figure 3 by means of helical springs 36, one of which surmounts the inner end of each of the rods 30, and has one end positioned against a disk 38, fitted in an annulus 40, mounted in a sleeve 26.

Figure 4:
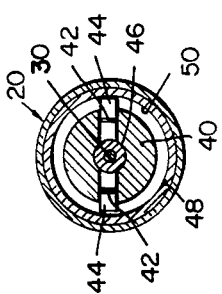
Figure 4 is a section on the line 4—4 of Figure 3, looking in the direction indicated.

Fastened to the inner end of the sleeve 26 is a pair of leaf springs 42, each of which carries at its inner end a wedge shaped element 44 which the springs 42 impel toward each other. These wedge shaped elements are separated by an inverted conical correspondingly wedge shaped plug 46, fitted onto the end of the rod 30, all as best shown in Figures 3 and 4, and the secondary sleeve 48 is fitted between the inner face of the post 20 and the outer face of the sleeve 26 for proper alignment of the assembled parts. This secondary sleeve 48 has an annular notch 50 therein, into which the wedges 44 are normally impelled by the spring 36 and plug 46.

When the center post 26 retracts, wedge shaped elements 44 resume their outwardly protruding position but are in the far end of the housing 20.

Figure 2:
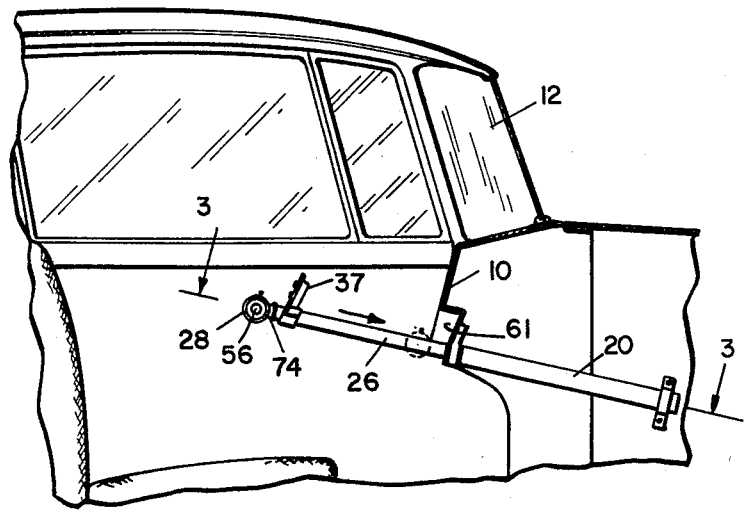
Figure 2 is a vertical section taken approximately on the line 2—2 of Figure 1, looking in the direction indicated and with certain parts omitted.

The buttons 32 are adapted to be withdrawn from contact with their supporting plate 34 by means of the wedge-shaped ends of rods 54, which pass longitudinally through the tubular control arm or handle 28, and terminate in push buttons 56 which are held in outward position by means of helical springs 58, each of these springs being mounted in a recess or housing 60 which forms part of an end plate for the tubular handle or control element 28. An inward push on the button 56 will cause the wedge shaped end of the rod 54 to retract the button 32, and its post 30, thereby pulling the plug 46 away from the two wedge elements 44, and allowing the springs 42 to move their inner ends out of the annular recess 50 in the secondary sleeve 48. When this is done, the handle, rod or bar 28, with the conduits 22 and 24, can be pushed inwardly in the direction shown by the arrow in Figure 2, and practically into a recess 61 provided for that purpose in the dash or instrument board 10.

Retraction of the shaft 30 with its plug 46 allows the wedge elements 44 to move out of the annular recess 50 in the sleeve 48, whereupon the posts 26 with their attachments can be readily pushed for a considerable distance into the sleeve or column 20 and with absolutely no contact with the spring 66. The only time that the spring 66 comes into action is the result of a sudden push on the handle 28 and attached elements and when the wedges 44 are in the recess 50, whereupon the sleeve 48 will move inwardly against the tension of the spring 66, resulting in a very desirable cushioning effect.

It will be noted that the secondary sleeve 48, while slidable in the cylindrical post 20, abuts against a stop sleeve 62, fixed in the post 20 by a set screw 64 so that outward movement is limited. However, the secondary sleeve 48 can be at all times move inwardly in the post 20 against the compression of the helical spring 66 fixed in the inner end of the hollow post 20 so that in the event of a crash or a sudden stop, the entire control post, with its fittings, will be moved by the operator's arms, hands or body inwardly against the compression of the springs 66, thereby cushioning the shock, and preventing serious injury to the head or body of the driver.

The space inside the post 20 is maintained substantially fluid-tight by an O-ring 68 in the inner end and by a flap or check valve 70 positioned over an opening in the closure 72 at the inner end. This flap valve is so arranged that air can readily escape from the interior in the event of a sudden inward movement of the control apparatus due to a crash or sudden stop, but will close at the end of the stroke, thereby preventing the springs 66 from forcibly and suddenly returning the equipment to its original position, which would obviously inflict more damage. The return movement is quite slow and any shock which might be due to the reverse spring action is adequately absorbed.

Figure 7:
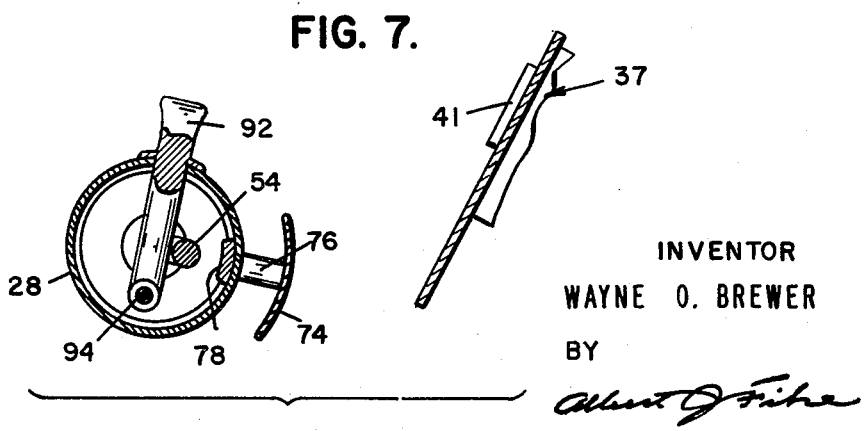
Figure 7 is a section on the line 7—7 of Figure 3 showing certain details of the steering and brake means.

As best shown in Figures 3 and 7, brake operating elements 74 are mounted adjacent the tubular handle or control bar 28, there being one for each hand, and these are somewhat arcuate, each having two supporting posts 76 which project through openings in the handle 28 and are mounted on individual arms 78. Both arms are pivoted at a common point 80 in the central portion of the structure. The inner end of each arm is provided with a lug or protuberance 82, and both of these protuberances act against a disk 84, held in position against the lugs by a spring 86. The disk 84 is on the end of a piston 88, mounted in a cylinder 90 which comprises a pilot valve for the hydraulic brake system. Accordingly, operation of the brakes is accomplished by simply pulling either or both arcuate elements 74 toward the handle portion 28 by the fingers, and fast or gradual stoppage is readily accomplished by a corresponding finger movement.

Figure 8:
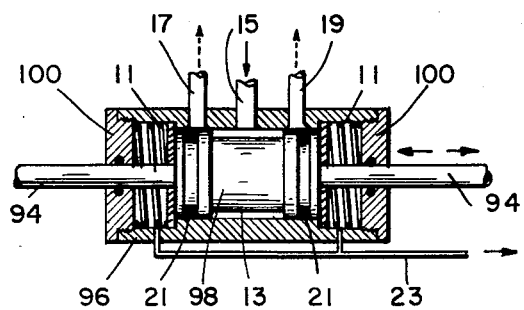
Figure 8 is a sectional view on the line 8—8 of Figure 3, looking in the direction indicated by the arrows and illustrating certain additional details.

Steering is accomplished by means of an upright 92 shiftably mounted in slots in the upper face of a rod handle or control bar 28. Each steering element 92 is fixed to the end of a pilot valve rod 94, both of which terminate in a cylinder 96 (Figure 8), and each of these shift rods 94 is mounted in the end of a piston 98, movable in the cylinder 96 which is closed at its ends by plates 100. Springs 11 tend to center the piston 98 in the cylinder and the piston is provided with a central portion 13 of less diameter than the cylinder, thereby allowing a flow of fluid into the corresponding space through a pipe 15 leading from the hydraulic pump. Additional pipes 17 and 19 lead from the cylinder 96 to the left and right turn cylinders respectively of the hydraulic steering apparatus, and O-rings 21 are provided in the piston to prevent leakage of fluid. When the shift rods 94 are moved in one direction or another by means of the steering finger pieces 92, the piston 98 will be accordingly moved as shown by the arrows in Figure 8, and turning of the steering wheels of the vehicle will accordingly result due to flow of the hydraulic fluid through one or the other of the pipes 17 and/or 19.

Any leakage of hydraulic fluid beyond the O-rings will be carried by a return pipe 23 to the hydraulic reservoir, thereby assuring of a proper balancing of pressure at all times, which in turn will provide a self-centering steering device with no possibility of creep to one side or the other due to some slight leakage.

The handle or control tube 28 is provided with two openings adjacent its middle portion, and a throttle operating button 25 is positioned in each of these openings, as best shown in Figures 3 and 7. Each of these throttle operating buttons is connected to a lever 27, which levers are pivoted at 29, and the ends of which contact a disk or the like 31 on the end of a rod 33, which leads to the carburetor of the engine of the vehicle. A spring 35 assists in maintaining the throttle lever in retracted or low-speed position.

A pair of conventional drive selector elements 37 are mounted on the supporting posts 26, one at each side and adjacent the handle 28 and brake combination 74, whereby control of the vehicle in high or low forward speeds, reverse and neutral, can be readily accomplished by finger tip operation, and without actually removing the operator's hand from the steering, brake or throttle control position. The neutral position button is shown at "N" or by the reference numeral 39 in Figure 3, the low drive by the reference numeral 41, the direct or higher speed drive button by the reference numeral 43, the reverse drive button by the reference numeral 45, and the horn operating button by "H" or the reference numeral 47. Right and left turn indicating switches are provided but only the left turn button is shown in Figure 3, this being indicated by the reference numeral 49, and the corresponding indicator light or arrow by the reference numeral 51.

Figure 5:
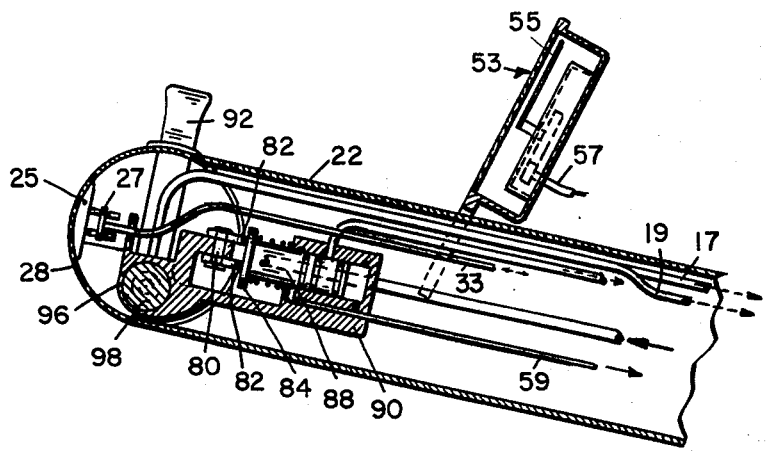
Figure 5 is a longitudinal section on the line 5—5 of Figure 3.
Figure 6:
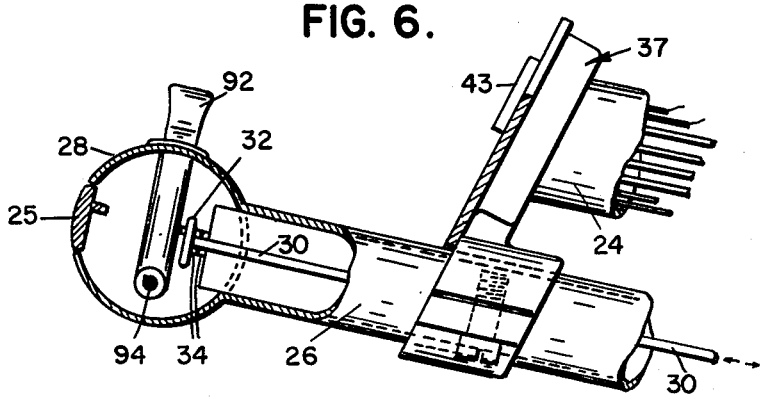
Figure 6 is likewise a longitudinal section on the line 6—6 of Figure 3, parts being omitted.

Mounted centrally of the apparatus is a wheel position indicator 53 (Figures 1 and 5), which is provided with a pointer 55 connected electrically or otherwise to the wheel positioning and steering cylinder 96. As shown in Figure 5, this is by means of a wire 57. By this means, the operator is immediately advised of the position of the steering wheels as soon as the apparatus is placed in operative position, usually by the insertion of a key into the ignition switch 63 (Figure 1). Therefore there is no danger of starting the car in an undesired direction.

A leakage drain pipe 59, similar to the leakage return pipe 23, for the steering mechanism is provided with a brake cylinder 90, all as best shown in Figure 5.

It will be evident that herein is provided in a single piece of equipment, a complete and very readily operated control apparatus for an automotive vehicle, and this with little or no variation can be readily employed on all types of such vehicles, such as large and small automobiles, motor trucks, bases and even tractors and heavier equipment.

The safety feature alone, whereby the column is spring loaded for accidental crash action and cushioned against rebound, is most valuable, and the fact that the entire device can be readily put away into a recess in the dash or instrument board provides a further distinct advantage.

The simplicity of steering, the ease of brake operation, the push button throttle control, and the finger tip movement of actual drive elements, horn, turn indicators, and the like, provides a distinctive simplicity of operation, ease of control, and makes possible actual safe driving with one hand. The wheel position indicator assures against undesirable starts in a wrong direction, and in hilly places the wheel can be turned into legal position against the curb without fear of difficulty when the car is again put into motion.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

A control system for automotive vehicles, comprising a pair of telescopic posts mounted adjacent the vehicle dash, a cross bar at the end of the posts, the telescopic portion of the posts comprising inner sleeves upon which the cross bar is mounted, brake, steering and engine throttle control means contained in the cross bar, the cross bar with its contents movable into a recess in the dash, locking means mounted in the posts for releasably retaining the cross bar in the recess when the vehicle is not in operation, said locking means including a secondary sleeve in the post, spring-impelled wedge elements co-acting with an annular groove in said secondary sleeve, a rod and push button mounted longitudinally of the inner sleeve, a conical element on the inner end of the rod adapted to contact the wedge elements mounted in said sleeve, the secondary sleeve being slidable in the post but surmounting the inner sleeve, a stop in the outer end of the post for limiting movement of the secondary sleeve and the inner sleeve in an outward direction, a horn button and turn indicators positioned on the cross bar as to be operated by the fingers of the driver, the brake and steering means adapted to be operated by the hands, fingers and thumb of the driver, spring means in the posts for cushioning the telescopic movement, the telescopic post construction being relatively fluid tight and a valve at the end of the post for permitting fast release of air but allowing only slow air ingress.

References Cited in the file of this patent

UNITED STATES PATENTS

| | | |
|---|---|---|
| 627,201 | Paget | June 20, 1899 |
| 1,920,890 | Rasmussen | Aug. 1, 1933 |
| 2,023,670 | Douglas | Dec. 10, 1935 |
| 2,331,996 | Maurer | Oct. 19, 1943 |
| 2,471,244 | Self | May 24, 1949 |
| 2,604,560 | Dibelka | July 22, 1952 |
| 2,631,468 | Thomas | Mar. 17, 1953 |
| 2,648,993 | Kemp | Aug. 18, 1953 |

FOREIGN PATENTS

| | | |
|---|---|---|
| 1,028,225 | France | May 20, 1953 |